United States Patent [19]

McPhee

[11] 3,999,630
[45] Dec. 28, 1976

[54] TRANSPORT AND SERVING DEVICE

[76] Inventor: Donald T. McPhee, 205 W. 112th St., Kansas City, Mo. 64114

[22] Filed: Mar. 26, 1976

[21] Appl. No.: 670,748

[52] U.S. Cl. .............................. 186/1 R; 244/118 P
[51] Int. Cl.² ........................................ B64D 11/00
[58] Field of Search ............... 104/89, 93, 95, 122; 105/148, 150, 154; 244/118 P; 186/1 R

[56] References Cited

UNITED STATES PATENTS

| 904,525 | 11/1908 | Frederick | 105/150 X |
|---|---|---|---|
| 3,102,607 | 9/1963 | Roberts | 244/118 P X |
| 3,179,208 | 4/1965 | Umanoff | 244/118 P X |
| 3,457,876 | 7/1969 | Holden | 105/150 X |
| 3,696,890 | 10/1972 | Armstrong | 104/93 X |

FOREIGN PATENTS OR APPLICATIONS 499,198  6/1937  United Kingdom ................ 104/89

Primary Examiner—Stephen G. Kunin
Attorney, Agent, or Firm—Thomas M. Scofield

[57] ABSTRACT

Transport, service and pick-up devices for use primarily in food, snack and beverage service in aircraft cabins; apparatus for loading, transporting, serving and picking-up of trays and containers used in serving meals, beverages and snacks to seated passengers in aircraft; a collapsible, storeable, transport service device suspended from an overhead monorail which, moving along the monorail, typically first receives a multiplicity of trays or objects from a storage and dispersal point in an aircraft cabin, then transports them to the passenger seating area, there permits distribution of the trays or objects to the passengers and, finally, thereafter, facilitates mass pick-up of the trays or objects from the passengers for transport back to the storage and dispersal point in the aircraft; a device of the character described which removably receives within itself loaded containers of trays for dispensing and pick-up of the trays from the containers.

32 Claims, 23 Drawing Figures

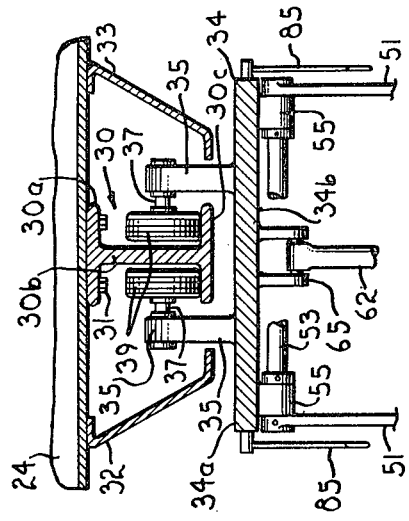
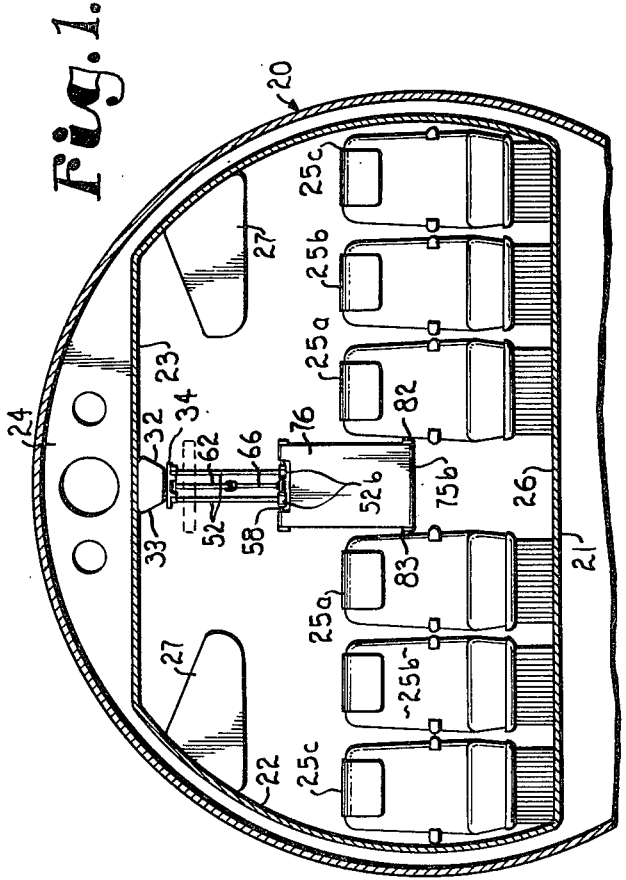
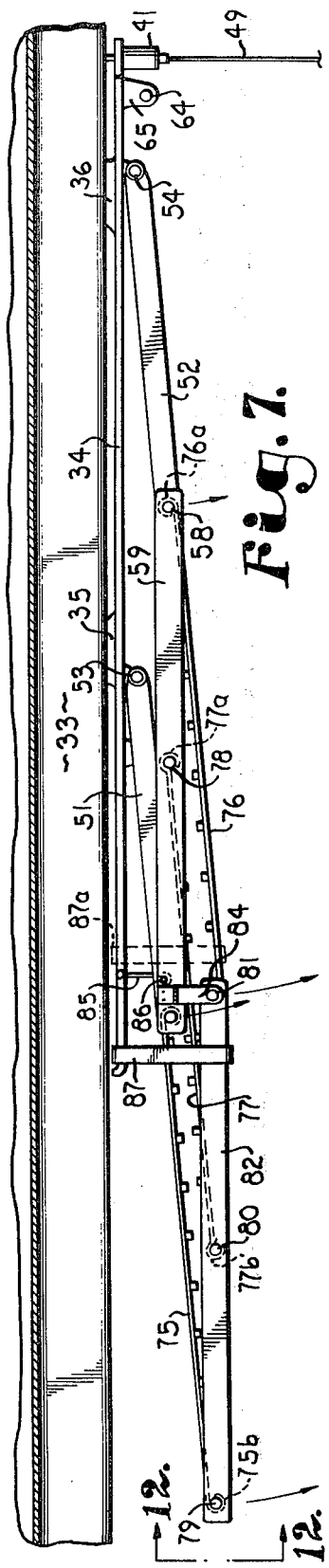

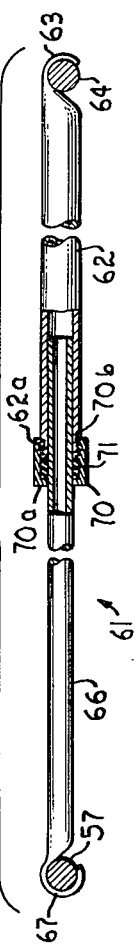
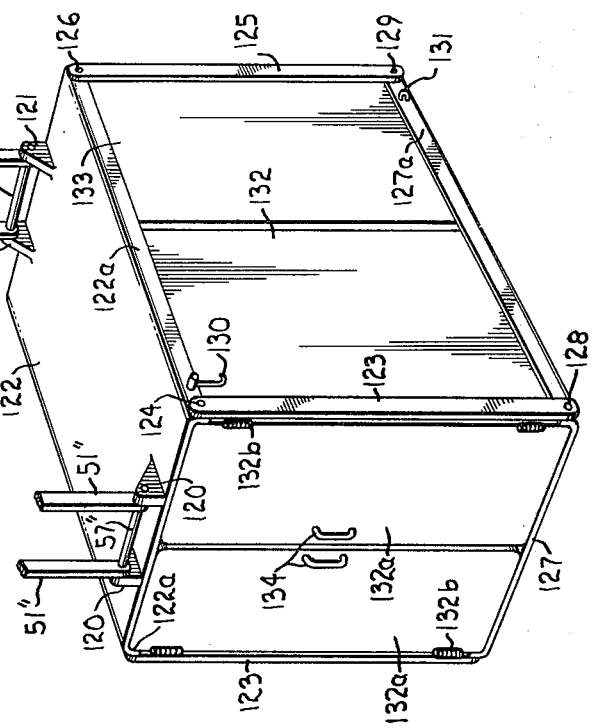
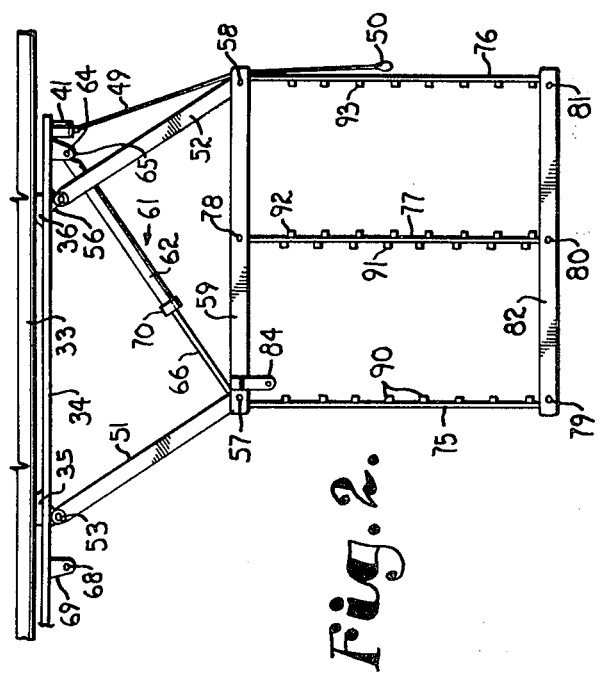
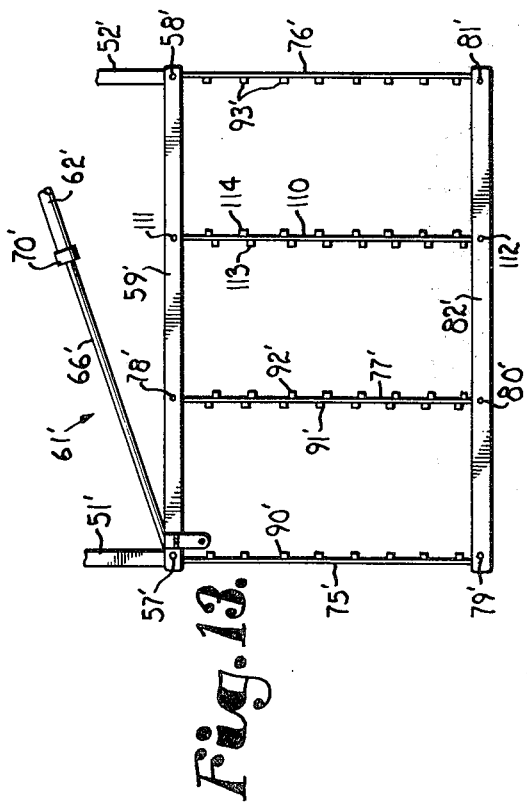

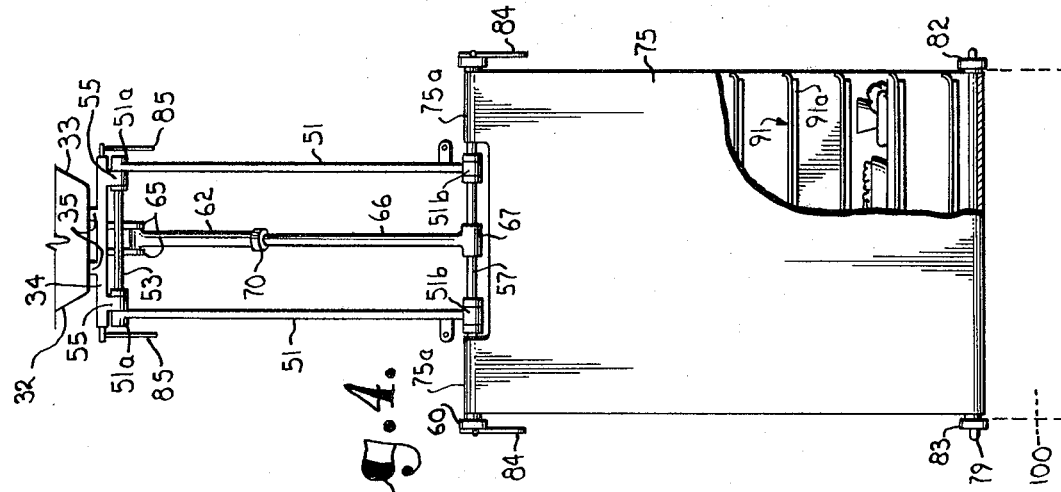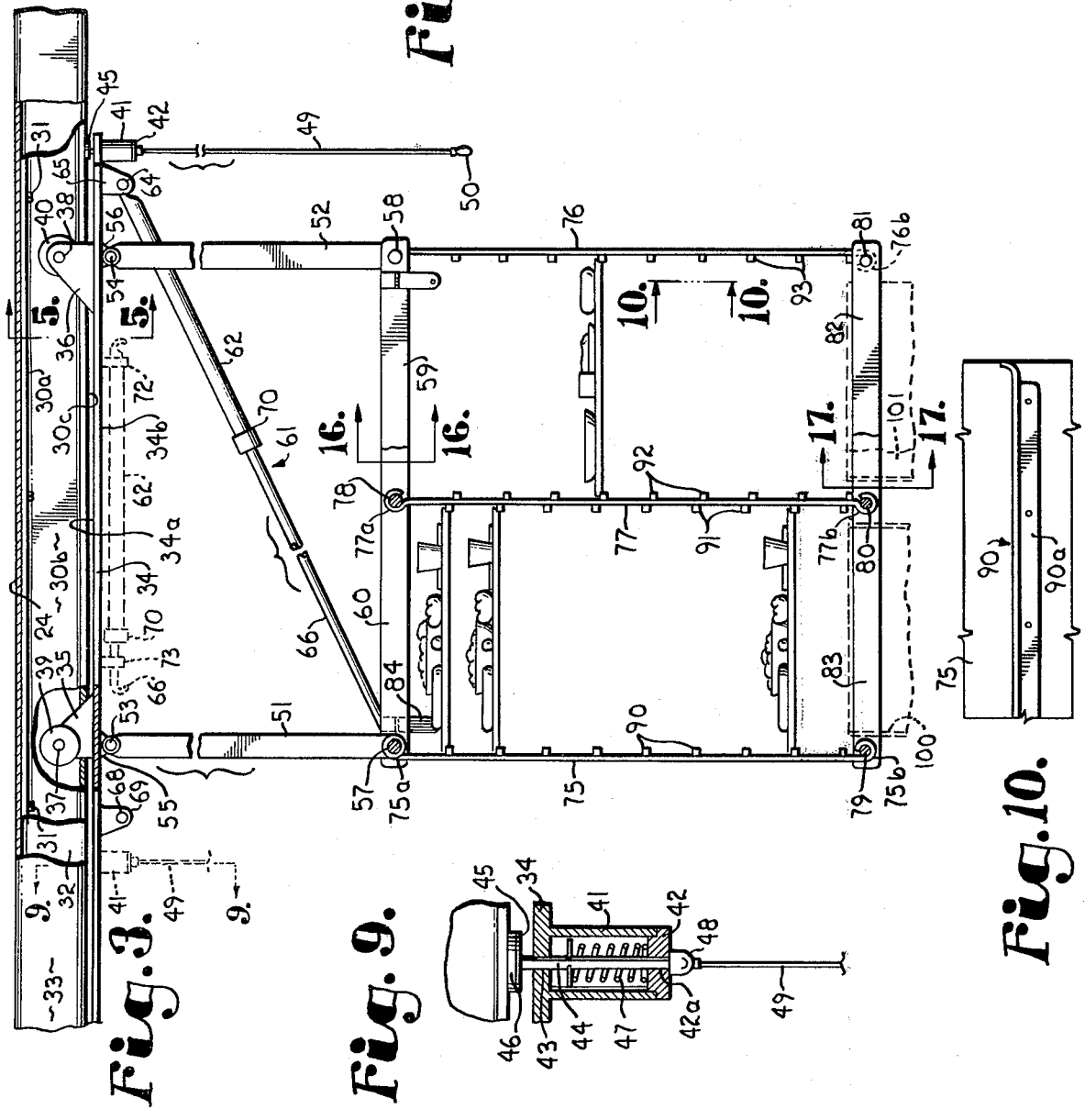

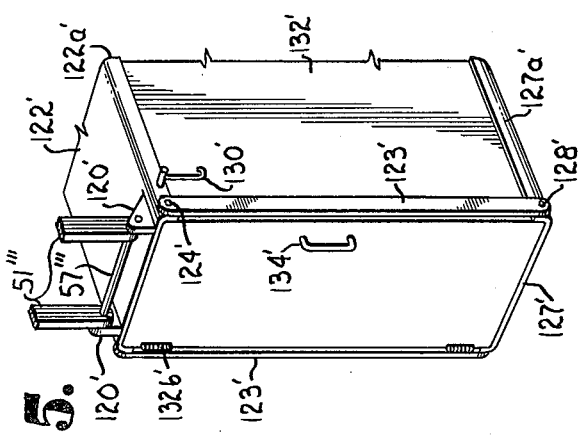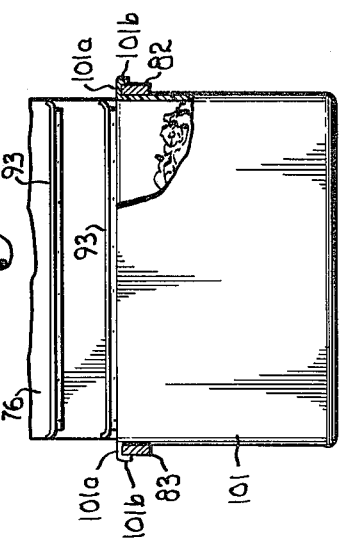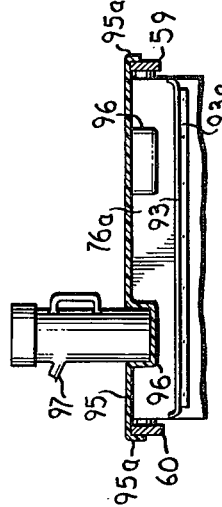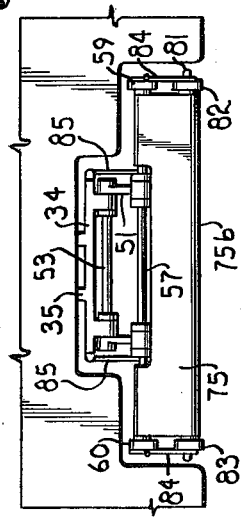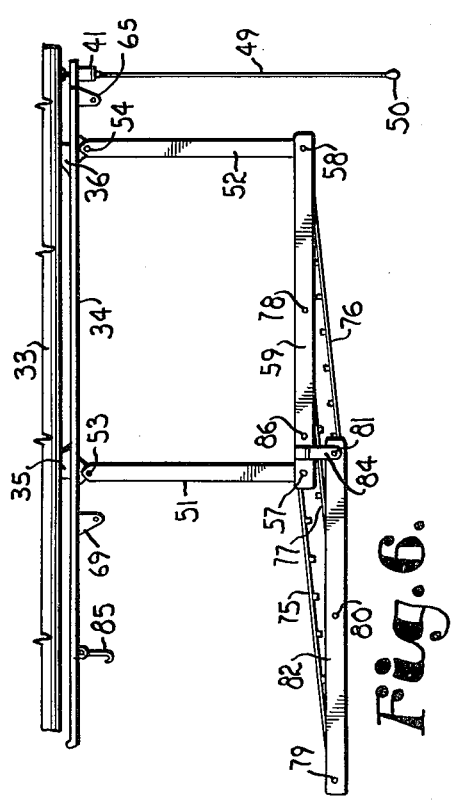

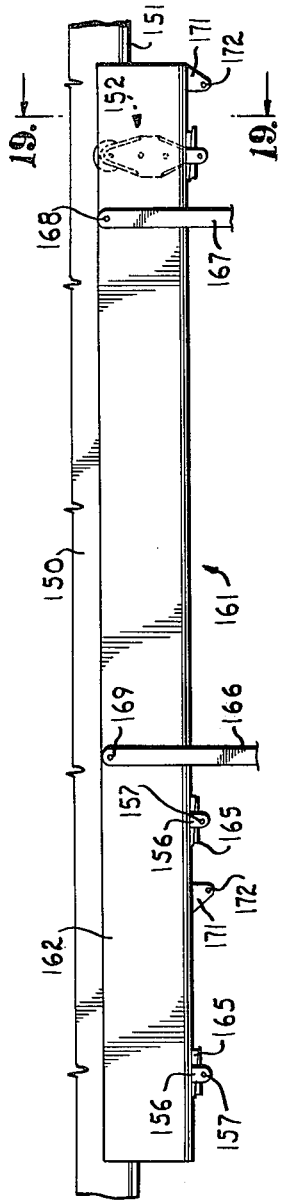
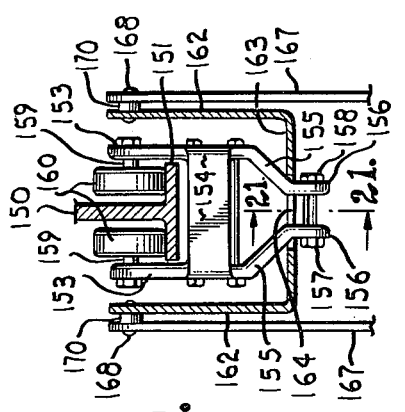
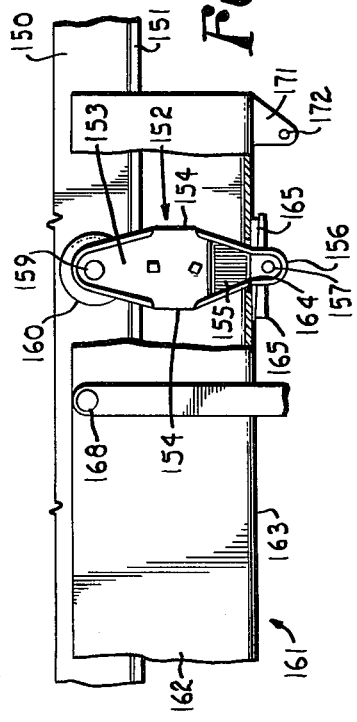
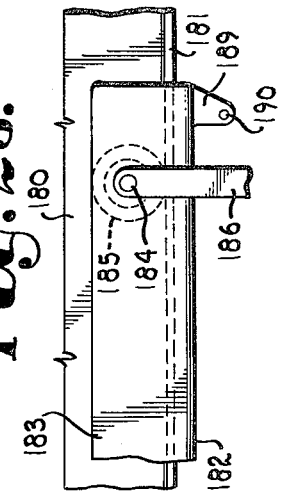
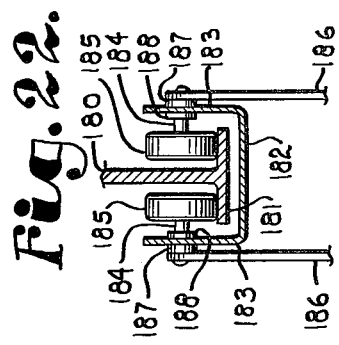
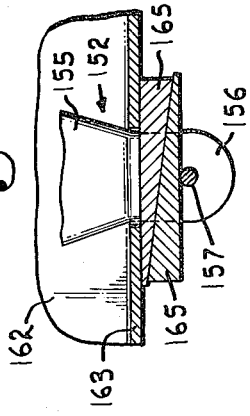

TRANSPORT AND SERVING DEVICE

BACKGROUND OF THE INVENTION

Problems associated with the dispensing and retrieval of food, beverages and other articles on passenger aircraft are well-known. These problems are serious on both short and long flights. Thus, on shorter flights, even in relatively small aircraft, the limited number of stewards or stewardesses are hard put to serve up to 100 passengers with food and beverages and retrieve the trays and containers operating from one dispensing location and within a short time interval. On longer flights, in large planes accommodating several hundreds of passengers, even with greater space and manpower, sometimes requiring many distribution points in the aircraft, as well as a longer time to serve, service and retrieval are also great problems when trays, etc. must be carried a few at a time by an individual with many trips to and from the supply area required.

In addition, when passenger movement is considered, as well as turbulence problems, the necessarily limited traffic area of a given aircraft compounds such problems because several stewardesses in the same area may interfere with one another's passage and function, as well as passenger movement.

It should also be noted that the airline passengers suffer just as much from the service deficiencies of the presently available equipment as the airline personnel. Ofttimes some passengers may not even get served on a given flight.

What is needed is a device which will enable large numbers of trays to be loaded thereon at the service area of the airplane, can move as a single unit into the serving area (passenger seating area) of the airplane and permit the service of the passengers sequentially from the device by one or more stewardesses working with the device. In this manner, all of the time and effort of the stewardess or stewardesses is devoted directly to loading the device, serving the passengers and thereafter picking up the used containers or trays without continuous travel to and from the service and dispensing zone of the aircraft being required. If such means were provided which would enable such concentrated loading, dispensing and pick-up, the crew would then be available for other personal attentions and services to the passengers. However, for this to be so, the time required in loading, dispensing and picking up food and beverages must be markedly reduced from the present situation to substantially serve the convenience of both the passengers and the stewardesses.

The entire purpose of the present invention is to provide a practical solution to these problems along the lines indicated. Further, another purpose is to reduce the crew manpower required to efficiently serve a given number of passengers in any particular aircraft.

THE PRIOR ART

I am aware of the following U.S. patents directed to the serving of food and other commodities to passengers in aircraft passenger compartments:

Roberts U.S. Pat. No. 3,102,607, issued Sept. 3, 1963 for "Carrier System for Transport and Delivery Along A Trackway";

Umanoff U.S. Pat. No. 3,179,208, issued Apr. 20, 1965 for "Aviation Food Serving System";

Cahn U.S. Pat. No. 3,295,635 issued Jan. 3, 1967 for "Air Passenger Means Conveyor";

Cahn U.S. Pat. No. 3,366,199 issued Jan. 30, 1968 for "Individual Service Tray Carrier Delivery and Return System";

Kenny U.S. Pat. No. 3,396,820 issued Aug. 13, 1968 for "Food Conveying Apparatus for Aircraft";

Kraly U.S. Pat. No. 3,558,086 Jan. 26, 1971 for "Food and Beverage Dispenser for Passenger Aircraft";

Rust U.S. Pat. No. 3,615,003, issued Oct. 26, 1971 for "Food Conveyor System For A Vehicle"; and Armstrong U.S. Pat. No. 3,696,890 issued Oct. 10, 1972 for "Article Delivery System".

OBJECTS OF THE INVENTION

A primary object of my invention is to provide an improved transport device for serving food, beverages or other items to a large number of persons located within a restricted area, such as on airplanes or airships, in a fast, efficient and safe manner.

Another object of the invention is to provide such a novel transport serving device which is of articulated, collapsible and folding construction whereby to be conveniently storable, yet readily made accessible for use, same supported by and movable on a monorail system which is readily ceiling or roof-mounted in an aircraft cabin or the like.

Another object is to provide such improved transport serving devices having a multiplicity of tray supports or shelves therein operable to accommodate in a minimum space a very large number of serving trays or other containers for ready dispensing of same to the users or consumers.

Yet another object is to provide such transport serving means which not only permit service or self-service of food, beverages or other items to the passengers and crew of an aircraft in fast and efficient manner, but further may be utilized in the pick-up and conveying of trays or other items, after use, in an extremely organized manner, to a service center for disposal or reuse after serving.

Another object of the invention is the provision of such systems, means and devices which are readily installable in present and future airplanes or airships with a minimum of modification and constructional change required thereto and which may be constructed in various sizes and capacities or employed in multiple units in a single airplane or airship to accomodate varying numbers and seating distributions of persons therein, depending on the passenger and crew capacity of the ship or plane and its seating layout.

Another object of the invention is to provide such improved means and devices for serving and handling food and other itmes in airplanes and airships which operate to centralize all the operations and efforts involved in the serving and picking up of trays and food related items in a new and novel manner, same most efficiently utilizing the services of a minimum number of people and most efficiently adapting to the particular task which is the swift, efficient, safe and convenient delivery and pick-up of food and drink carriers and trays in the aircraft.

Another object of the invention is to provide a central, rail mounted food and beverage dispenser that may be utilized to serve food and beverages in the passenger compartment of an aircraft, wherein only the center aisle of the passenger compartment is employed for transport and dispensing and there is no interference with or transportation of items over the passenger seat area.

Another object of the invention is to provide improved means for and methods of dispensing food and beverages in an aircraft from an elevated, rail mounted central dispenser.

Another object of the invention is to provide a particular suspension and carrying means particularly for utilization in the passenger compartment of an aircraft, which suspension and carrying means is articulated and collapsible, as well as adjustable in various modes and positions for optimum efficiency in use and handling, there being three particular modes, at least, of use, namely, first, an uppermost, collapsed mode for storage, secondly, an intermediate suspension mode for filling, transport, dispensing and pick-up of items such as trays for beverages and food and, finally, a lowermost rest or secured position for stabilizing the device during its use under unstable air conditions or maneuverability conditions of the aircraft.

Another object of the invention is to provide a basic frame and suspension means and system for uses and conditions of the type described, which basic suspension system and means can be adapted to various modes of handling items to be dispensed, such as bulk container-receiving or individual tray-receiving, as specific examples.

Still further objects of the invention include the provision of methods, means and systems for optimizing the handling of food and beverage operations in aircraft, including loading, unloading, serving, picking up and the like of food and beverage carrying trays or containers in high density seating systems where a minimum of space is available, which system has a greatly enlarged capacity and improved characteristics with respect to formerly available systems and devices, as well as requiring far less modification and change in the aircraft structure.

Another object of the invention is to provide such improved devices of the character described which, in aiding and facilitating the centralization of food and drink dispensing operations, will permit future aircraft to have or require fewer galleys or service centers with, further, greater flexibility for the aircraft designers in deciding upon the location of the food dispensing and service centers in a given aircraft.

Another object of the invention is to provide such devices of the character described wherein, under certain circumstances, the passengers themselves may employ self-service in pick-up and dispensing of trays from those certain portions of the device which are not readily available to the stewardess or stewardesses servicing the particular construction.

Yet another object of the invention is to provide an alternative construction of mass food and beverage handling service wherein the transport and carrying device removably receives within itself loaded containers of individual trays, thereby to permit dispensing and pick-up of the trays from the said loaded containers themselves, whereby the latter may be handled as units from externally of the plane, such containers providing heat insulation of the group of trays, etc.

Still another object of the invention is to provide devices of the character described wherein the transport and handling construction can be maneuvered or manipulated in the aisle of the aircraft to permit passage therepast of crew members or passengers, if necessary or desired.

Still another object of the invention is to provide transportation devices and means which, while operative and useful to transport large numbers of trays in the food delivery and pick-up service, also is readily manipulatable, movable and handleable both to store the device and remove it from storage for use without problems of time delay or difficulties in handling.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

DESCRIPTION OF THE DRAWINGS

FIG. 1 is a somewhat schematized, vertical section taken transversely through the upper portion of an airliner fuselage showing the subject food handling and dispensing device in end view and positioned for use in dispensing food or beverage carrying trays therefrom to the passengers. This view looks from right to left in FIG. 3.

FIG. 2 is a side view of the device seen centrally of FIG. 1 in its semi-elevated position for use in normal dispensing or collection of food and beverage carrying trays (as seen in FIG. 1).

FIG. 3 is an enlarged side view of the device of FIGS. 1 and 2, the view like that of FIG. 2, but with the entire assembly in its lowermost position (where it could rest on the arms of the aisle seats for additional stability), portions cut away to better illustrate the construction of the device.

FIG. 4 is an end view of the device of FIGS. 1–3, inclusive, looking from left to right in FIG. 3. A portion of the end wall of the device is cut away to better illustrate the manner and mode of receiving and securing food trays therein.

FIG. 5 is an enlarged detail of the carriage system, taken along the lines 5—5 of FIG. 3 in the direction of the arrows.

FIG. 6 is a view like that of FIGS. 2 and 3, but with the lowermost portion of the assembly collapsed upwardly and engaged so as to prepare the device and assembly for storage out of the way after use.

FIG. 7 is an enlarged side view like FIGS. 2, 3 and 6, but with the uppermost portion of the device also folded upwardly or collapsed for storage and retained in such position.

FIG. 8 is an enlarged, partly sectioned detail of an adjustable arm which fixes the height of the device and assembly, in use.

FIG. 9 is an enlarged fragmentary view taken along the lines 9—9 of FIG. 3 in the direction of the arrows showing one form of a brake mechanism for use with the subject device.

FIG. 10 is a partial fragmentary view taken along the lines 10—10 of FIG. 3 in the direction of the arrows showing the tray receiving flanges (one end thereof) of the device.

FIG. 11 is a view like that of FIG. 7, but with the upper portion of the device pivoted or folded in the opposite direction from that of FIG. 7 to give a different storage configuration.

FIG. 12 is a view taken along the lines 12—12 of FIG. 7 in the direction of the arrows, but also showing the device of FIGS. 7 amd 12 recessed into the ceiling of an airliner so configured therefor.

FIG. 13 is a fragmentary side view of another modified form of device differing from that of the previous figures only by the fact that it is adapted to receive three sets of trays therein.

FIG. 14 is a three-quarter perspective view from above of a modified form of the subject dispensing means and device wherein the structure thereof is adapted to receive, removably, closed containers of trays which may be inserted into the frame of the device end-wise for dispensing from the ends of the device by the aircraft personnel.

FIG. 15 is a fragmentary three-quarter perspective view from above of another modified form of the subject dispensing means and device substantially like that of FIG. 14, but much narrower in order that the device may be employed in an airliner having a considerably narrower aisle.

FIG. 16 is a view taken along the lines 16—16 of FIG. 3 in the direction of the arrows showing the uppermost frame construction of the device in FIG. 3, this view having added thereto a tray adapted to overlie the top portion of the frame and carry a coffee pot or the like therein for dispensing to the passengers.

FIG. 17 is a view taken along the lines 17—17 of FIG. 3 in the direction of the arrows illustrating a removable waste hamper which may be inserted into the frame during the process of pick-up of trays and other materials from the passengers.

FIG. 18 is a side view of a modified form of suspension means for the food and tray handling devices of the previous figures, comprising a view like the top portion of FIG. 7.

FIG. 19 is a view taken along the lines 19—19 of FIG. 18 in the direction of the arrows.

FIG. 20 is an enlarged, fragmentary view of the right-hand end of FIG. 18 with a portion of the structure cut away to better illustrate the suspension means and structure.

FIG. 21 is a view taken along the lines 21—21 of FIG. 19 in the direction of the arrows.

FIG. 22 is a view like that of FIG. 19, but showing an alternative suspension means for mounting the devices constituting the instant invention from a ceiling mounted beam member.

FIG. 23 is an enlarged, fragmentary side end view like that of FIG. 20, but without parts cut away of the FIG. 22 device.

DESCRIPTION OF STRUCTURE AND FUNCTION

Referring to the drawings, and first particularly FIG. 1, therein is seen an aircraft fuselage generally designated 20. FIG. 1 is a transverse section through a typical such fuselage, showing a cabin having a floor 21, arcuate side walls 22 and a roof 23. The overhead structurals are generally designated 24. No attempt is made to detail the aircraft structure, per se, including the baggage hold typically below the passenger compartment, etc.

Within the cabin proper, there are provided rows of seats with the aisle seats generally labeled 25a, the middle seats 25b and the window seats 25c. The central aisle 26 carries all passenger, crew and stewardess traffic. Standard overhead carrying racks 27 may additionally be provided of any desired conventional structure, one of which is shown.

One of the primary goals of the instant improvement is to provide a device for transporting and serving trays, articles, and the like to the seated passengers in an aircraft fuselage where the entire carrying and transporting device, as well as the suspension means therefor, are centrally positioned in the aircraft over the aisle. In newly built aircraft, the monorail support may be recessed into the ceiling, whereby to give an additional several inches of extra height. However, in the form shown, the monorail suspension system is connected to the overhead structurals and depends downwardly therefrom. It is assumed that the height of the cabin ceiling and the monorail suspension depending therefrom, above the floor of the cabin, is sufficient to permit adequate headroom and clearance.

The monorail suspension system is particularly seen in FIGS. 3 and 5. It will now be described.

An elongate I-beam generally designated 30 with an upper flange 30a, normally horizontal, a normally vertical central flange 30b and a normally horizontal lower flange 30c is fixed by bolts or other means 31 to the underside of the plane fuselage upper structurals 24. Lateral covers or screen members 32 and 33 are preferably provided to screen the sides of the suspension system for protection thereof, as well as obscuring the mechanism from the passengers' view.

It should be understood that, while an inverted T-section carrying beam (members 30b and 30c) is illustrated, a C-section member with but a single pair of engaging wheels (as compared to the system illustrated) may be employed. That shown, however, is preferred. Any conventional monorail-beam suspension can be used, including a depending L-shaped beam in place of the T-beam.

Thus there is first provided an overhead, elongate, normally horizontally oriented monorail construction. Mounted on and carried by the said monorail is a first frame assembly which is also movable on said monorail. This comprises, first, an elongate, normally horizontal beam 34 having an upper side 34a and an underside 34b. Fixed to the topside 34a of beam 34 are two sets of two brackets 35 and 36, which brackets carry normally horizontal shafts 37 and 38 thereon in suitable connectors, the shafts 37 and 38 mounting front and rear wheels 39 and 40. Wheels 39 and 40 run on the upper side of flange 30c of the monorail member 30. While two sets of wheels are illustrated depending on the size and length of the device, three or more sets may be used.

As previously mentioned, a C member may be substituted for the I member 30 with but a single forward wheel 39 and a single rearward wheel 40 mounted thereon. However, the structure shown is very usable and workable.

The first frame assembly described additionally carries a brake member on one or both ends thereof, as desired, which is operable by the stewards or stewardesses working with the transport service device. Preferably, the brake employed is normally applied so the entire transport service device will be maintained at one fixed position along the aisle of the aircraft fuselage for service thereat until the brake member is released for translation of the basic suspension, first frame assembly, along the monorail.

The brake member specifically seen to the right (and to the left) in FIG. 3 (and in section in FIG. 9) comprises a cylindrical housing 41 which is fixed to or made integral with the underside 34b of beam 34, having end closure 42 screwed or otherwise removably fixed in the free lower end thereof. A passage 42a is provided through cap or closure 42 and an opening 43 through beam 34. Elongate shaft 44 extends through the openings 42a and 43 and is of length greater than housing 41. A plate 45 having brake pad 46 on the upper side thereof provides a frictional brake element to abut the underside of the I-beam flange 30c. Spring 47 normally biases shaft 44 upwardly to force brake pad 46 against the underside of I-beam flange 30 to provide braking action. a removable stop 48 is connected to the lower end of shaft 44 and has pull cord or cable 49 thereon with grip 50 adjacent the lower end thereof. Pulling downwardly on cord 49 against spring 47 releases the brake with pad 46 coming away from its frictional contact with the underside of flange 30c.

Other brake devices may be substituted for that one described.

Positioned below the upper support and carrying frame just described is a second frame assembly which is supported by and depends from the beam 34. In the construction shown, this overhead comprises two sets of elongate, normally substantially vertical, spaced, double beam members 51 (front) and 52 (rear). The upper ends of beam members 51 and 52, respectively, are mounted on normally horizontal shafts 53 and 54 which are journaled in and through downwardly extending ears 55 (front) and 56 (rear). Members 51 have upper end collars 51a which encircle shaft 53 and lower collars 51b which grip forward lower shaft 57. The same is true with respect to the rearward double beam members 52 which encircle and engage at their lower ends lower rear shaft 58. Suitable stop collars (not numbered) are positioned on shafts 53 and 54 and 57 and 58 adjacent ears 55 and 56 engaging upper shafts 53 and 54 and collars 51b and 52b on shafts 57 and 58 below. Thus, the pair of normally horizontal, elongate, transverse first shafts 57 and 58 are each connectably engaged at their ends by the lower ends of the beam members 51 and 52 of one set thereof.

A first pair of normally horizontal, connecting arms 59 and 60 are provided to connect the opposed, outer ends of shafts 57 and 58, whereby to maintain the sets of beam members 51 and 52 in parallel relationship to one another as they may be pivoted from the vertical position of FIG. 3 to a position angular or arcuate with respect thereto (to the left or right in the view).

It is evident that the second frame assembly is pivotable from a lowermost position with the beam members 51 and 52 vertical and the first shafts 57 and 58 (and connecting arms 59 and 60) vertically spaced away from beam 34 to an uppermost position (FIGS. 7 or 11) with the beam members 51 and 52 substantially horizontal and the first shafts 57 and 58 (and connecting arms 59 and 60) closely adjacent the beam.

Means are provided communicating between the underside of beam 34 and one of said first shafts 57 and 58 operable to releasably fix the second frame assembly in any desired position between its upper and lower positions. Such means is here shown as an elongate, extensible, telescoping arm member generally designated 61. This member is detailed in FIG. 8.

The height adjusting means, or arcuate position adjusting means for the second frame assembly with respect to beam 34, member 61, is here illustrated as an elongate hollow cylinder 62 having hook means 63 at the upper end thereof to releaseably engage a shaft 64 mounted between brackets 65 and an elongate rod 66 having an open hook type engaging means 67 at the lower end thereof. Rod 66 telescopes in and out of cylinder 62 for arcuate position adjustment of the second frame assembly with respect to beam 34 as seen in FIGS. 2 and 3. A second shaft 68 may be mounted between brackets 69 at the forward end of beam 34 so that the lower hook member 67 is free to engage either shaft 57 or 58, depending upon whether the upper hook member 63 is engaging shaft 64 or 68. In order to releasably fix the relative extension of piston or rod 66 with respect to cylinder 62, releasable engaging means are provided therebetween. In the specific example shown, this involves external threading of cylinder 62 as at 62a on the lower end thereof, with sleeve 70 having opening 70a therethrough and rubber or composition ring 71 therewithin, threaded onto the lower end of cylinder 62. The internally threaded end of sleeve 70 is designated 70b. Screwing sleeve 70 onto threaded end 62a of cylinder 62 compresses resilient ring 71 so as to tightly engage the outer surface of piston or rod 66. Unscrewing sleeve 70 releases ring 71 so that rod 66 may be moved inwardly or outwardly of cylinder 62.

Brackets 72 and 73 (FIG. 3) may be provided to hold the device of FIG. 8 is compacted position when the transportation service device is out of use and in storage in one of the position of FIG. 7 or FIG. 11.

It should be noted that, while the second frame assembly structure is preferably that just described and illustrated in the drawings, it is not necessary to have pairs of beam members 51 and 52. Instead, a single beams member 51 or 52 could be suspended from beam 34 in forward and rearward positions, each such single beam member engaging shaft 57 or 58, respectively. However, the double beam member system shown and described, for strength an stability purposes, is preferred.

In turning to the description of the third frame assembly, the receiving and dispensing portion of the transport serving device in question, a distinction is made between the modified forms of the third frame assembly seen in FIGS. 14 and 15 and those of the rest of the figures, which will be first described. The third frame assembly of FIGS. 14 and 15 is adapted to receive containers or casings therewithin, as units. This is not the case in the third frame assembly seen in the rest of the figures, particularly detailed in FIGS. 3 and 4.

Referring, then, to FIGS. 3 and 4, the third frame assembly supported by and depending from the second frame assembly comprises a first, forward transverse wall member 75 which is pivotally mounted on and depends from shaft 57 by collars 75a at the upper end thereof. A second, transverse, rearward wall member 76 is pivotally mounted on and depended from shaft 58 by like collars 76a (FIG. 7). Preferably, there is provided an intermediate third, normally vertical, transverse wall member 77 which is pivotally mounted on and depends from another transverse shaft extending between and mounted on arms 59 and 60, this shaft being numbered 78. It is engaged by one or more collars 77a at the top end of wall member 77.

Three normally horizontal, elongate, transverse second shafts 79, 80 and 81 are embraced or enclosed by collars 75b, 77b and 76b, respectively, at the bottom of walls or sheets 75–77, inclusive, these shafts extending between and pivotably engaging a second pair (lowermost) of normally horizontal connecting arms 82 and 83.

Thus, it may be seen that the third frame assembly is pivotable from a lowermost position with the walls 75–77, inclusive vertical, to an uppermost position with the said walls substantially horizontal as seen in FIGS. 6, 7 and 11. FIG. 6 shows the first stage of collapse and securement of the several frame assemblies with the third frame assembly secured in its collapsed position (its uppermost position) by depending tabs 84 engaging the extreme ends of shaft 81 at the bottom of wall 76. It should be evident that tabs such as 84 could be fixed at either end of arms 59 and 60, or both ends thereof, so that, optionally, the third frame assembly may be swung up to its uppermost storage position either to the left or to the right (clockwise or counter-clockwise) from the position seen in the view of FIG. 3.

Likewise, once the third frame assembly has been secured in its uppermost position, whichever way (to the right or to the left in FIG. 3) it would be pivoted upwardly for securement, then the second frame assembly is pivoted either clockwise or counter-clockwise in the view of FIG. 3 (around shafts 53 and 54) to collapse it for storage. Generally speaking, the lower frame assembly, the third frame assembly, is collapsed and secured upwardly before removal and storage of arm member 61, for stability purposes. Once, however, the third frame assembly is up into the position of FIG. 6 (or 180° opposite thereto in the other direction), then the arm member 61 is removed as seen in FIG. 6, or disengaged at one end.

The securing means for the second frame assembly with respect to the beam 34 may be one or more hooks 85 (FIG. 7) engaging pins 86 on the inboard sides of arms 59 and 60 or straps 87 and/or 87a which loop over or fasten to the top of one end of beam 34 or portion thereof and around and under the arms 82 and 83. Both such means may be employed.

The essence of collapsing and securement of the third frame assembly is to tie the members 82 and 83 to members 59 and 60. In order to collapse and secure the upper (second) frame assembly, there must be a tie between beam 34 and members 59 and 60 or beam 34 and members 82 and 83, or both (the latter seen in FIG. 7). Comparing FIG. 7 and FIG. 11, in the former, the collapsed device is of considerably greater length, collapsed, than the latter. However, the FIG. 7 collapsed arrangement gives a more or less tapering (from the ceiling) side view from the rear, assuming the device is to be stored forwardly. This would give the maximum head room to the rear. The reversal of the collapsing of FIG. 7 could assume rear storage. If the FIG. 11 collapsing is reversed, with the pivots around shafts 53 and 54 clockwise and the pivots around shafts 57 and 58 counter-clockwise (the reverse of that seen), the collapsed device has the same overall size and extent, but displaced to the left in the view.

Typcially, in an aircraft, stowage would be to the rear of the cabin, with any rearward projection extending into the tail zone out of the cabin with securement to rear structurals. A hood or shield would cover any extension into the upper rear cabin space. The monorail might run at least to the front of the passenger seating section and forward of that if one food storage and preparation zone was in a forward area. At any rate, the monorail would run as required to serve the passengers by transporting food from the service area.

Means are provided on the facing or opposed sides of adjacent walls 75 and 77 and 77 and 76 for receiving and retaining trays thereon. These means, which are the same, are generally designated 90 on the rear face of wall 75, 91 on the front face of wall 77, 92 on the rear face of wall 77 and 93 on the front face of wall 76. The details of means 90–93, inclusive are seen in FIGS. 4 and 10, comprising elongate flanges, normally horizontal, having upwardly turned lateral edges (for tray retention) and support flanges 90a, 90a, etc. fixed to the underside thereof for attachment to the wall faces. The tray retaining lips or flanges 90 and 91 of walls 75 and 77, facing one another, are on the same level. the retaining lips or flanges 92 and 93 of walls 77 and 76, facing one another, are also level with one another, but displaced upwardly or downwardly, whereby there will be minimum problem of interference on collapsing of the frame assemblies to storage position as in FIGS. 6, 7 and 11. The spacing between the successive levels of flanges 90 and 91, etc. must be sufficient that the conventional tray contents, including cups, glasses, whatever, will not interfere with one another in vertical stacking. This also means no interference when the trays are slightly lifted to move them laterally to the passengers over the slightly upturned lateral lips of the flanges 90, 91 etc.

In the serving, dispensing and picking up of food trays, meals, snacks and the like in the airplane, beverage container refilling (such as coffee) and trash pick-up are two items of major importance. In order to take care of the former, a tray-container construction as particularly seen in FIG. 16 may successfully be employed. Thus, the third frame assembly, and the second frame assembly are both open with respect to one another, that is, the space between arms 59 and 60 is open down into the zones between the walls 75, 77 and 76. Accordingly, there is provided a metal sheet (or other strong material sheet) tray 95 having one or more central wells 96 therein operative to receive containers of liquid such as coffee pots as seen at 97, the tray 95 having lateral depending edges 95a which engage and overlie the outer faces of horizontal arm members 59 and 60. Two or more of these trays may be positioned Under the arm member 61 on the loaded tray in order to permit the ready dispensing of coffee, water, tea or the like to the passengers as the transport serving device is moved along. These trays 95 may or may not be employed on the first pass down the cabin from the food dispensing point or kitchen of the plane, but they readily may be employed at any time as their presence does not interfere in any way with the loading or dispensing of the trays from the device.

In order to readily accommodate the pick-up of used trays with used napkins, plates, cups, etc. from the passengers, the open lower structure of the frame is most readily employed in the manner seen in FIGS. 3 and 17 where the trash or refuse container structure and mounting is shown. Thus, optionally, at any time, the steward or stewardesses may mount in the lower open portion of the third frame assembly, at the bottom thereof, supported by the arms 82 and 83, one or more trash containers 100 or 101. These comprise rectangular plastic or metal sheet wastebasket-like hoppers or receptacles wherein the side walls thereof have horizontal flanges 101a (FIG. 17) thereon with normally vertically extending engaging flanges 101b fixed thereto whereby to securely mount the trash hoppers or containers 100 and 101 in the lowermost portions of the third frame assembly. As noted with respect to the coffee trays 95, the trash hoppers or containers 100 and 101 may be mounted at any time, but generally are used and employed with the transport serving device only on pick-up of trays for convenience of handling on the part of stewards and stewardesses. Because these hoppers or containers are supported only on the lowermost horizontal arms 82 and 83, again, they do not interfere with the pick-up, insertion or removal of the trays, loaded or unloaded into the tray receiving zones.

In operation of the device of the figures previously described (excepting FIGS. 13–15, inclusive), the height of the entire device, when it is the lowermost position possible, as seen in FIG. 3, is preferably such that the arms 82 and 83 would rest on and lie against the top side of the arm rests next the aisle of the row of seats 25a on each side of the aisle. This is not the normal operating position, which is actually seen in FIGS. 1 and 2, with the said lower arms 82 and 83 and the lower ends 75b, 77b and 76b of walls 75, 77 and 76 spaced somewhat upwardly from the said arm rest. Said otherwise, in the position of FIGS. 1 and 2, the height regulating device 61 is so engaged with shafts 57 and 64 (or shafts 58 and 68) that the second frame assembly is arcuately moved off the lowermost position in either clockwise or counterclockwise direction sufficient to give the said desired clearance.

The rationale of gauging the length of the entire transport-serving device with respect to the seat arm rest is that, in case of turbulence or angle of climb or descent of the aircraft, the lower end of the third frame assembly may be dropped into frictional contact with the said arm rests for greater security. On the other hand, in normal level dispensing and pick-up conditions, without any great air turbulence, the said second frame assembly is arcuately canted to give easy clearance over the arm rests and free movement of the wheels 39 and 40 along the monorail flange 30c, provided the brake or brakes are released for such. It is also not necessary that the devive be in the absolute lowermost position of FIG. 3 to contact the arm rests in order to insure that a good solid contact thereon is insured, if desired. The latter means that the overall height of the device, in the position of FIG. 3 may be greater than that which would reach the aisle seat arm rests.

Removable transverse beams connecting the ends of shafts 57 and 81 or 79 and 58 or both may also be employed to rigidify the third frame assembly.

In operation of the device so far described, assuming that the transport service device is in the storage position of FIG. 7 or that of FIG. 11, the crew whose duty it is to dispense food, etc. goes to the end of the fuselage or position where the device is stored and, by releasing one or more brakes moves the device sufficiently into the cabin to be usable. Additional securing means other than those shown may, of course, be employed ridigly fixing the beam 34 and any other desired parts of the collapsed assembly to the top structurals or end structurals of the aircraft. Once the device is free for access, the hooks 85 and the bands or straps 87 and 87a may be removed, whereby the second frame assembly permits the device to assume the position of FIG. 6. Alternatively, the device is moved to the food dispensing area by release of the brake or brakes 41 by pulling on cable 49. At that area, hooks 85, etc. (and any other securing devices employed) may be released and the second frame assembly lowered into, the position of FIG. 6. Thereafter, by release of straps 84 (and any other securing devices employed) the third frame assembly is lowered into the position of FIG. 3. Either before or after this is done, the arm member 61 may be emplaced with the arcuate position of the second frame assembly regulated to the desired position such as that seen in FIGS. 1 and 2.

By moving the device from storage to the food service area in the positions of FIG. 7 or FIG. 11, minimum aisle obstruction occurs. If only beverages are to be dispensed, he device may be moved in the aisles in the position of FIG. 6 with trays (FIG. 16) on top.

Thereafter, the meal trays, snack trays and the like are loaded onto the flanges 90–93, inclusive, with or without the trash bins 100 and 101 and coffee trays mounted, or either of them, in the frame assembly. Then, by releasing the brake or brakes, the stewards or stewardesses move the entire device along the monorail to the initial serving position. At that position, the stewardesses, preferably one at each end of the device) may dispense the trays to the passengers or they may reach into the aisle (form the aisle seats) and aid in the dispensing of the trays. Thus the device moves along the aisle dispensing trays until all have been dispensed or all of the passengers served. One or more additional loadings of the device may be required to serve all the passengers.

In the transport-service device of all of the figures except 13–15, inclusive, there is specifically illustrated such a device which will receive, store, dispense and pick-up at least 18 to 36 trays. Additionally, a coffee-water service is provided and a continuous trash or used tray pick-up facility provided. Thus, for example, with only 2–4 round trips to the food dispensing zone, a team of stewardess can effectively serve seventy-two passengers. Pick-up is equally expedited. Additionally, both stewardesses) or stewardess, if only one is using the device) are always where they are needed, that is, at the food dispensing zone loading the device or unloading it, or in the passenger area unloading the trays or picking them up. There is an absolute minimum of waste motion with the aisle effectively free when the device is back at the food loading zone or not adjacent to a given seating zone.

Where a single stewardess is present, she would be positioned at one end of the device, adjacent the brake. The other end of the device or zone thereof away from her would necessarily require some self-service, both in picking up and unloading. Along this vein, in FIG. 13, there is seen a very large capacity device having three interior zones and dispensing and extra set of trays (or picking them up). Since none of the parts of this device would differ from the arts of the two zone transport service device of the previously described figures, all of the parts which are essentially the same as those previously described are numbered the same, but primed. The only difference between the device of FIG. 13 and the previously described figures is in the greater length of the device and corresponding length required of the various parts of the frame assembly which are horizontal, namely, the beam 34, the arms 59 and 60 and the lower arms 82 and 83. Still further, the member 61 would be of greater length in both parts thereof. The only element new, then, in the view, other than the different proportion of length of the device, would be the provision of the fourth vertical wall 110 pivotably mounted on shafts 111 and 112, which shafts would be mounted on arms 59' and 60' and 82' and 83', respectively. Suitable tray receiving flanges 113 and 114 would be provided on each side thereof analogous to those previously described which would oppose and cooperate with the same flanges 92' and 93' on walls 77' and 76'.

In the use and operation of the device of FIG. 13, even with two stewards or stewardesses working with the device, access to the central zone of the third frame assembly would be relatively difficult and self-service might be required by the passengers with respect to dispersal of and return of the trays. This is assuming that the device itself is as wide as that seen in FIG. 1 whereby no side access to the outer zone of the device by the stewardesses is feasible.

Turning to FIGS. 14 and 15, therein is shown a modified form of the invention and improvement wherein the prepared food trays to be dispensed are brought into the aircraft in containers, already stored in racks within the containers. In this situation, it may be desirable to provide a transport serving device which will merely receive the containers, themselves, for carriage by the transport serving device, rather than require the emptying of the container carried onto the aircraft and charging of racks in the food storing zone and then a further transfer into the transport serving device. Accordingly, the lower portion of the device, particularly the lower portion of the second frame assembly and the third frame assembly, are provided of a different structure. The upper portion of the second frame assembly and the first frame assembly are the same and thus not again illustrated and will not be again described.

Referring, then, to FIG. 14, within the second frame assembly, there is seen the downwardly extending ends of the two sets of elongate, normally substantially vertical, spaced doubled beam members, here designated 51'' and 52''. These sets of beam members are connectably engaged at their lower ends by a pair of normally horizontal, elongate, transverse first shafts here designated 57'' and 58'', which are also connected to and received in two sets of flanges or ears 120 (shaft 57'') and 121 (shaft 58''). Flanges, tabs or ears 120 and 121 are rigidly connected to the upper side or face of a normally horizontally oriented roof member 122 of rectangular form which, by said flanges 120 and 121 and shafts 57'' and 58'', is pivotably connected to and supported by the lower ends of the beam members 51'' and 51''. The side edges 122a of roof member 122 are preferably downwardly turned as seen.

A first pair of second beam members 123 is pivotally mounted on the leading ends of downwardly turned edges 122a of roof member 122 by pins or shafts 124. A second pair of second beam members 125 pivotably depend from the side edges of the opposite ends of said roof member by shafts or pins 126. A floor member 127 is provided, preferably of congruent shape to the roof member 122, but inverted with respect thereto so that the elongate side edges 127a thereof extend upwardly. The said side edges 127a are coupled to the lower ends of the second beam members 123 and 125 by pins or shafts 128 and 129, respectively. Pivotal hooks 130 mounted adjacent one end of roof member 122 on downwardly extending edges 122a are engageable with loops 131 on the opposite ends of edges 127a of floor member 127 for collapsing of the third frame assembly for storage of the device.

There are shown two containers 132 and 133 received in the lower portion of the device of FIG. 14 seized between and frictionally engaged by roof member 122 and floor member 127. Container 132 has doors 132a mounted on hinges 132b for opening at the ends thereof by grasping handles 134. Alternatively, four containers of the size seen in FIG. 15 could be carried.

When the stewardess desires to either dispense the trays from the container 132 or return same into the container, she merely opens one or both doors 132a by pulling handles 134 for acces to the inside of the compartments. Typically, inside each door 132a is a space like a space between, say, wall 77 and wall 76 of FIG. 2. Container 133 is the same as container 132, but opening in the other direction. Once the containers are charged into the device between the roof member and the floor member, they will remain therein until the containers are removed.

FIG. 5 is a device precisely like that of FIG. 14, but only one-half of a container (compared to FIG. 14) wide. This permits handling and use of the device of FIG. 15 in narrower aisles than would be the case in the device of FIG. 14. Also in the devices of FIGS. 14 and 15, either there must be a crew member at each end thereof or the device must be maneuvered into a clear zone so the crew member can walk therearound in order to dispense from both ends.

In the device of FIG. 15, parts essentially the same as those of FIG. 14 are numbered the same, but primed or triple primed, respectively.

FIGS. 18–21, INCLUSIVE

The particular suspension system seen in the foregoing figures, particularly FIGS. 3, 5, 7 and 9, with respect to the monorail and the first and uppermost frame assembly, is very dependable and adequate in use and in operation. However, (see FIG. 1) when that particular system is actually depended from an existing ceiling and structurals thereabove, one problem that arises, or may arise, with respect to the first and uppermost frame assembly, is that it takes height out of the cabin in the aisle portion thereof. Specifically, since it is desired that the third frame assembly be of the largest capacity possible, while still having the relationship to the seats and seat arms seen in FIG. 1 and previously described, under certain circumstances it is preferred to have an alternative monorail suspension structure usable with the instant device. Such is seen in FIGS. 18–21, inclusive.

The first frame assembly seen in these figures has a number of advantages, when compared with the first frame assembly of the previously mentioned figures, particularly FIGS. 3, 5, 7 and 9. Thus, first, the structural member from which the second frame assembly is depended comprises a U-section channel member which is typically hung and sported from the bottom, normally horizontal, leg of the U. The beam members of the second frame assembly may be pivotally mounted high on the sides of the channel, thus giving a very high level of support and pivot for same. The connection and suspension of the channel member from the wheeled carriers, as will be described, may be made removable so that the entire channel may be readily taken down from its high or ceiling mounting, thus permitting essentially complete storage of the entire device wherever desired on the aircraft, in addition to the storage options previously described with respect to the previous figures. Finally, the normally vertical legs of the channel are so sized and so positioned as to cover and screen the lower part of the monorail which receives the wheels of the wheeled carriers, so that additional screening structurals are not necessarily required and the working parts of the monorail system are effectively screened form the personnel and passengers in the cabin.

Referring, then, to FIGS. 18–21, inclusive at 150 is seen the normally vertical leg of an I or inverted T member usable in a monorail system. The lower leg 151 of this monorail member is here seen making a T structure with the lower end of normally vertical member 150, analogous to members 30b and 30c of FIG. 5. As previously mentioned, a C or J-shaped member used with single side wheels may be alternatively employed. The upper portion of beam member 150 may be the upper end of an I beam member as at 30a in FIG. 5, with suitable connection to structurals or member 150 fixedly attached to ceiling or roof structurals in the aircraft, depending upon its individual and particular structure.

At least two wheeled carrier members generally designates 152 are provided which comprise normally vertical upper side plates 153 which are joined together and spaced apart by integral beams 154 on both end edges of plates 153. Integrally connected to the lower ends of plates 153 are inwardly converging members 155 which each have, at their lowermost edges, normally vertical end plates 156. Bolts 157 having externally threaded shafts thereon receive nuts 158 threaded thereon to control the spacing apart of lowermost normally parallel plates 156. Shafts 159 are mounted at the or adjacent the upper edge or extremity of normally parallel and normally vertical plates 153, extending inwardly of plates 153 and rotatably mounting wheels 160.

The channel member which is carried by the wheeled assemblies 152 comprises a U-section elongate channel generally designated 161 having normally vertical, parallel sides 162 and normally horizontal bottom side 163. Spaced openings are provided centrally of bottom wall 163 at 164, whereby to pass through the bottom wall 163 the downwardly extending plate members or tabs 156. Shims or wedges 165 (particularly FIG. 21) are emplaced under lower wall 163 and over bolt members 157 joining tabs 156 to one another in order to support channel 161 by the wheeled assemblies 152. Other means 165 may be used.

By knocking out the wedges or shims 165, the channel may be dismounted from the wheeled assemblies, as well as the suspended means therebelow (comprising the second and third frame assemblies of structure similar to that previously described).

The mounting of the two sets of elongate, normally substantial vertical, spaced double beam members (here 166 and 167) is accomplished by shafts or pins 168 and 169 (FIG. 18), which pivotally connect the said sets of beam members to the uppermost (preferably) extremities of the channel side walls 162. Spacers 170 (only seen in FIG. 19) may be employed to clear the beam members from contact with the side walls 162 of the channel member 161.

If but single beam members (instead of sets of two) are to be employed such would preferably be pivotally mounted on the bottom wall 163.

Braking devices (not seen) are employed in the manner of the devices of FIG. 9. Such could be mounted on bottom wall 163 cooperating with the underside of flange 151.

The lowermost portions of the device in question are not illustrated as they are the same as may be seen in the previous figures, including the modifications of FIGS. 2, 13 and 14. There is also provided, at at least two positions on the bottom wall 163 of the channel member 161, the paired tabs or ears 171, each set carrying therebetween a shaft or pin 172 of similar structure to members 65 and 64 of FIGS. 5 and 7 adapted to engage and be disengaged with an arm member 61 as seen in FIG. 8.

If desired, the coupling together of the three frame assemblies may be made readily disengageable so that each of the frame assemblies may be readily disengaged, one from the other, for storage purposes. Generally speaking, however, this will not be the case and the entire unit will remain in an assembled, but collapsed position in storage for ready transformation into a use and functional mode.

FIGS. 22 AND 23

FIGS. 22 and 23 show a very simplified and minimal depth suspension system utilizing a U-section channel.

Normally vertical beam web 180 is structurally mounted on the upper or roof structurals of an aircraft in conventional fashion and has transverse lower flange 181 integral or connected thereto. Again, a C or J construction alternatively may be employed in the place of a T or I beam configuration, as previously discussed.

A U-section channel is provided having bottom wall 182 and normally vertical side walls 183. Pins or shafts 184 serve two purposes. First, they rotatably mount wheels 185 thereon on the inwardly extending ends thereof. Secondly, on the outboard ends thereof they pivotally mount paired sets of beam members 186. Spacers 187 may be provided to clear the downwardly extending beam members 186 from the side walls 183 of the channel member. Shafts 184 extend through openings (not seen) in the upper parts of the side walls 183 and may be fixed with respect thereto by members or washers 188.

There are additionally provided, spaced apart on the bottom wall 182 of the U section, channel member tabs or ears (sets thereof) 189 mounting therebetween shafts 190 for engagement and disengagement of members as seen in FIG. 8.

One or more brake units as in FIG. 9 may be mounted on wall 182 of the channel cooperating with flange 181.

If the sets of beam members (as 186) are to each be replaced on one beam member, such would preferably be pivotally mounted on wall 182.

At least two and optionally three or more sets of wheels 185 are provided for the channel member. Typically only two of such sets have the beam members of the second frame assembly as at 186 pivotally depended therefrom. Other than the structure described, the structure and function of the second and third frame assemblies used with the first frame assembly seen in FIGS. 22 and 23 are the same as previously described.

The channel construction, the monorail carriage thereof and the beam element mounting of FIGS. 22 and 23 occupy a minimum space and, particularly, a minimum height even compared with the system of FIGS. 18–21, inclusive.

On large planes, such as the Boeing 747, where there are two aisles and the total number of passengers in the plane may approach approximately 350 people, a monorail would be provided for each aisle and probably there would be at least two large type devices of the character described on each of the monorails.

With respect to the disassembly potential seen in the device of FIGS. 18–21, inclusive, typically the device would not have to be disassembled for each flight, but should lend itself to relative ease of disassembly so same could be removed by a group of men easily. Thus, if the device was not needed on a particular airplane for several days, it would be made available to another one during this interval. Particularly contemplating the devices of FIGS. 14 and 15, a food catering service, including supplying, installing and perhaps actual dispensing of the food on the plane, could be offered. All that would be needed would be the presence of a monorail in the plane to be serviced. With this type of device, food service could be standardized and the same kind of device used for a particular kind of plane irregardless of airline ownership.

Thus it is seen that devices have been provided which make available to the aircraft personnel considerably more time to see and insure that the passengers are safe and comfortable. For a given personnel complement on a given plane, introduction of this device will, in effect, free one or more for considerably greater concentration on and attention to duties related to safety and comfort of the passengers, rather than food service.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A transport serving device comprising, in combination,
  1. an overhead, elongate, normally horizontally oriented monorail,
  2. a first frame assembly supported by and movable on said monorail comprising an elongate, normally horizontal support carried by at least two spaced wheels rotatably riding on said monorail,
  3. a second frame assembly supported by and depending from said support comprising:
     a. two sets of elongate, normally substantially vertical, spaced double beam members, each pivotally depending at one end thereof from the said horizonal support,
     b. a pair of normally horizontal, elongate, transverse first shafts each connectably engaged at its ends by the lower ends of the beam members of one set thereof, and
     c. a first pair of normally horizontal connecting arms joining the opposed outer ends of said shafts,
  4. said second frame assembly pivotable from a lowermost position with the beam members vertical and the first shafts and connecting arms vertically spaced away from the support and an uppermost position with the beam members substantially horizontal and the first shafts and connecting arms closely adjacent the support,
  5. means communicating between said support and one of said first shafts operable to releasably fix said second frame assembly in any desired position between its lower and upper positions,
  6. a third frame assembly supported by and depended from said second frame assembly comprising:
     a. a first transverse wall member pivotally mounted on and depending from one of said shafts,
     b. a second, transverse wall member pivotably mounted on and depended from the other of said shafts,
     c. a pair of second, normally horizonal, elongate, transverse second shafts, each one of said second shafts carried and engaged by the lower end of one of said walls, and
     d. a second pair of normally horizontal connecting arms joining the opposed outer ends of the said second shafts,
  7. said third frame assembly pivotable from a lowermost position with the walls vertical to an uppermost position with the said walls substantially horizontal,
  8. means for removably supporting said third frame assembly in its uppermost position from said second frame assembly, and
  9. means for supporting articles to be dispensed associated with said walls.

2. A device as in claim 1 including brake means on said support releaseably engaging said monorail.

3. A device as in claim 1 wherein the means for releaseably fixing the second frame assembly in various positions comprises a lockable, telescoping shaft pivotably connectable at one end to the support and at the other end to one of said first shafts.

4. A device as in claim 1 including third ones of said first and second shafts centrally connecting the first and second beam arms and a third, normally vertical wall mounted at its ends on same and means on said opposed wall faces for supporting articles to be dispensed.

5. A device as in claim 1 wherein the means for removably supporting said third frame assembly in its uppermost position comprises means on said first connecting arms removably engageable with means on said second connecting arms.

6. A device as in claim 1 including a removable tray member for overlying, extending between and connecting said first connecting arms.

7. A device as in claim 1 including a removable bin member for overlying, extending between and connecting said second connecting arms.

8. A device as in claim 1 wherein the monorail is of inverted T-section and the first frame assembly is movably mounted on said monorail by two sets of two wheels each.

9. A device as in claim 1 including means for removably securing the collapsed device to the support when the second and third frame assemblies are both in the uppermost positions.

10. A transport serving device comprising, in combination,
  1. an overhead, elongate, normally horizontally oriented monorail,
  2. a first frame assembly supported by and movable on said monorail comprising an elongate, normally horizontal support carried by at least two spaced wheels rotatably riding on said monorail,
  3. a second frame assembly supported by and depending from said support comprising:
     a. two sets of elongate, normally substantially vertical, spaced double beam members, each pivotally depending at one end thereof from the said horizontal support, b. a pair of normally horizontal, elongate, transverse first shafts each connectably engaged at its ends by the lower ends of the beam members of one set thereof, and c. a normally horizontally oriented roof member pivotally connected to and supported by the lower ends of said beam members and said first shafts, 4. said second frame assembly pivotable from a lowermost position with the beam members a substantially vertical and the first shafts and roof member vertically spaced away from the support and an uppermost position with the beam member substantially horizontal and the first shaft and roof member closely adjacent the support, 5. means communicating between said support and one of said first shafts operable to releaseably fix said second frame assembly in any desired position between its lower and upper positions, 6. a third frame assembly supported by and depended from said second frame assembly comprising:

a. a first pair of second beam members pivotably mounted on and depending from the side edges of one end of the roof member, b. a second pair of second beam members pivotably depending from the side edges of the opposite end of said roof member, c. a floor member substantially congruent to said roof member pivotally connected to the lower ends of said second beam members at the end corners thereof, 7. said third frame assembly pivotable from a lowermost position with the second beam members substantially vertical and the floor member spaced away from the roof member to an uppermost position with the said second beam members substantially horizontal and the said floor member closely adjacent said roof member, and 8. means for removably supporting said third frame assembly in its uppermost position from said second frame assembly.

11. A device as in claim 10 including brake means on said supporting releaseably engaging said monorail.

12. A device as in claim 10 wherein the means for releaseably fixing the second frame assembly in various positions comprises a lockable, telescoping shaft pivotably connectable at one end of the support and at the other end to one of said first shafts.

13. A device as in claim 10 wherein the means for removably supporting said third frame assembly in its uppermost position comprises means on said roof member removably engageable with means on said floor member.

14. A device as in claim 10 wherein the monorail is of inverted T-section and the first frame assembly is movably mounted on said monorail by two sets of two wheels each.

15. A device as in claim 10 wherein means for removably securing the collapsed device to the support when the second and third frame assemblies are both in their uppermost positions.

16. A device as in claim 10 wherein said roof member and said floor member are substantially rectangular in shape and the roof member having downwardly turned side edges and the floor member having upwardly turned side edges, with the said second beam members pivotably connected to said roof and floor member side edges.

17. A transport serving device comprising, in combination, 1. an overhead, elongate, normally horizontally oriented monorail, 2. a first frame assembly supported by and movable on said monorail comprising an elongate, normally horizontal support carried by at least two spaced wheels rotatably riding on said monorail, 3. a second frame assembly supported by and depending from said support comprising:

a. two elongate, normally substantially vertical, spaced beam members, each pivotably depending at one end thereof from the said horizontal support, b. a pair of normally horizontal, elongate, transverse first shafts each connectably engaged by the lower end of one of said beam members, and c. a first pair of normally horizontal connecting arms joining the opposed outer ends of said shafts, 4. said second frame assembly pivotable from a lowermost position with the beam members vertical and the first shaft and connecting arms vertically spaced away from the support and an uppermost position with the beam members substantially horizontal and the first shafts and connecting arms closely adjacent the support, 5. means communicating between said support and one of said first shafts operable to releaseably fix said second frame assembly in any desired position between its lowermost and uppermost positions, 6. a third frame assembly supported by and depending from said second frame assembly comprising:

a. a first transverse wall member pivotably mounted on and depending from one of said shafts, b. a second, transverse wall member pivotably mounted on and depended from the other of said shafts, c. a pair of second, normally horizontal, elongate, transverse second shafts, each one of said second shafts carried and engaged by the lower end of one of said walls, and d. a second pair of normally horizontal connecting arms joining the opposed outer ends of the said second shaft, 7. said third frame assembly pivotable from a lowermost position with the walls vertical to an uppermost position with the said walls substantially horizontal, 8. means for removably supporting said third frame assembly in its uppermost position from said second frame assembly, and 9. means for supporting articles to be dispensed associated with said walls.

18. A device as in claim 17 including brake means on said support releaseably engaging said monorail.

19. A device as in claim 17 wherein the means for releaseably fixing the second frame assembly in various positions comprises a lockable, telescoping shaft pivotably connectable at one end of the support and at the other end to one of said first shafts.

20. A device as in claim 17 including third ones of said first and second shafts centrally connected the first and second beam arms and a third, normally vertical wall mounted at its ends on same and means on said opposed wall faces for supporting articles to be dispensed.

21. A device as in claim 17 wherein the means for removably supporting said third frame assembly in its uppermost position comprises means on said first connecting arms removably engageable with means on said second connecting arms.

22. A device as in claim 17 including a removable tray member for overlying, extending between and connnecting said first connecting arms.

23. A device as in claim 17 including a removable bin member for overlying, extending between and connecting said second connecting arm.

24. A device as in claim 17 wherein the monorail is of inverted T-section and the first frame assembly is movably mounted on said monorail by two sets of two wheels each.

25. A device as in claim 17 including means for removably securing the collapsed device to the support when the second and third frame assemblies are both in their uppermost positions.

26. A transport serving device comprising, in combination,
 1. an overhead, elongate, normally horizontally oriented monorail,
 2. a first frame assembly supported by and movable on said monorail comprising an elongate, normally horizontal support carried by at least two spaced wheels rotatably riding on said monorail,
 3. a second frame assembly supported by and depending from said support comprising:
  a. two elongate, normally substantially vertical, spaced beam members, each pivotably depending at one end thereof from the said horizontal support,
  b. a pair of normally horizontal, elongate, transverse first shafts each connectably engaged by the lower end of one of said beam members,
  c. a normally horizontally oriented roof member pivotally connected to and supported by the lower ends of said beam members and said first shafts,
 4. said second frame assembly pivotable from a lowermost position with the beam member substantially vertical and the first shaft and roof member vertically spaced away from the support and an uppermost position with the beam member substantially horizontal and the first shaft and roof member closely adjacent the support,
 5. means communicating between said support and one of said first shafts operable to releaseably fix said second frame assembly in any desired position between its lower and upper positions,
 6. a third frame assembly supported by and depending from said second frame assembly comprising:
  a. a first pair of second beam members pivotably mounted on and depending from the side edges of one end of the roof member,
  b. a second pair of second beam members pivotably depending from the side edges of the opposite end of said roof member,
  c. a floor member substantially congruent to said roof member pivotably connected to the lower ends of said second beam members at the end corners thereof,
 7. said third frame assembly pivotable from a lowermost position with the second beam member substantially vertical and the floor member spaced away from the roof member to an uppermost position with the said second beam members substantially horizontal and said floor member closely adjacent said roof member, and
 8. means for removably supporting said third frame assembly in its uppermost position from said second frame assembly.

27. A device as in claim 26 including brake means on said support releaseably engaging said monorail.

28. A device as in claim 26 wherein the means for releaseably fixing the second frame assembly in various positions comprises a lockable, telescoping shaft pivotably connectable at one end to the support and at the other end to one of said first shafts.

29. A device as in claim 26 wherein the means for removably supporting said third frame assembly in its uppermost position comprises means on the said roof member removably engageable with means on said floor member.

30. A device as in claim 26 wherein the monorail is of inverted T-section and the first frame assembly is movably mounted on said monorail by two sets of two wheels each.

31. A device as in claim 26 including means for removably securing the collapsed device to the support when the second and third frame assemblies are both in their uppermost positions.

32. A device as in claim 26 wherein said roof member and said floor member are substantially rectangular in shape with the roof member having downwardly turned side edges and the floor member having upwardly turned side edges, with the said second beam members pivotally connected to said roof and floor member side edges.

* * * * *